No. 708,055. Patented Sept. 2, 1902.
J. B. LINN.
ELECTRIC CONTROLLER.
(Application filed Feb. 15, 1901.)
(No Model.) 3 Sheets—Sheet 1.
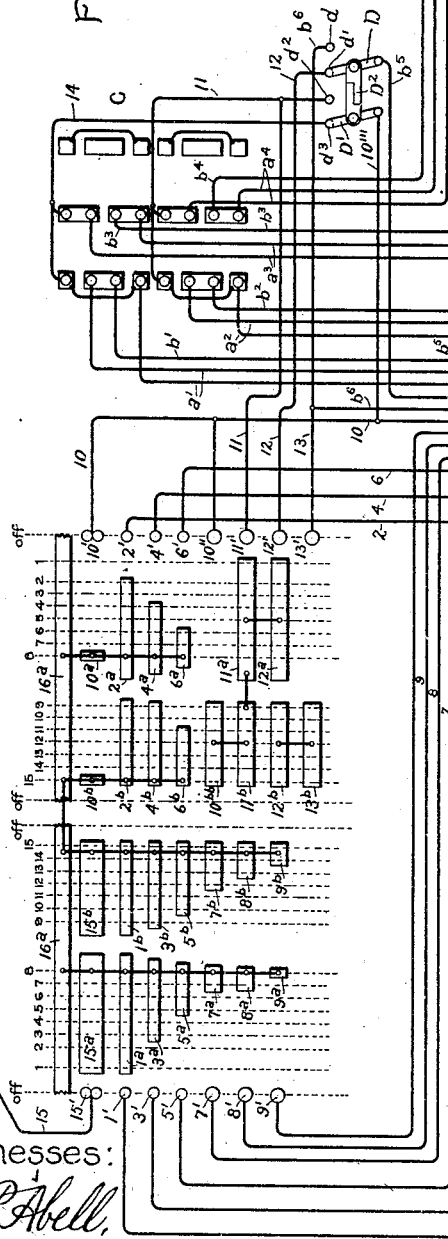
Witnesses:
L. P. Abell,
Benjamin B. Hull.
Inventor:
John B. Linn,
by Albert G. Davis
Att.

No. 708,055.  Patented Sept. 2, 1902.
J. B. LINN.
ELECTRIC CONTROLLER.
(Application filed Feb. 15, 1901.)

(No Model.)  3 Sheets—Sheet 2.

Witnesses
Lewis S. Abell
Alex F. Macdonald

Inventor
John B. Linn,
by Albert H. Dain
Atty

No. 708,055.

J. B. LINN.
ELECTRIC CONTROLLER.
(Application filed Feb. 15, 1901.)

Patented Sept. 2, 1902.

(No Model.)

3 Sheets—Sheet 3.

Witnesses.
John Ellis Glenn
Benjamin B. Linn

Inventor:
John B. Linn,
by Albert G. Davis
Atty.

THE NORRIS PETERS CO., PHOTO-LITHO., WASHINGTON, D. C.

UNITED STATES PATENT OFFICE.

JOHN B. LINN, OF SCHENECTADY, NEW YORK, ASSIGNOR TO GENERAL ELECTRIC COMPANY, A CORPORATION OF NEW YORK.

ELECTRIC CONTROLLER.

SPECIFICATION forming part of Letters Patent No. 708,055, dated September 2, 1902.

Application filed February 15, 1901. Serial No. 47,398. (No model.)

*To all whom it may concern:*

Be it known that I, JOHN B. LINN, a citizen of the United States, residing at Schenectady, county of Schenectady, State of New York, have invented certain new and useful Improvements in Electric Controllers, (Case No. 1,295,) of which the following is a specification.

This invention relates to controllers for electric motors, and has for its object to simplify the construction of the cut-out switch in a controller of a series-parallel type.

My invention is applicable either to a motor equipment comprising two motors or to an equipment in which there are two groups connected either in series or in parallel by the motor-controller. In any case the members of the cut-out switch are so constructed and arranged that whenever either of the motors of a two-motor equipment or either of the groups of motors in an equipment employing more than two motors are cut out of circuit the controller-cylinder is automatically prevented from passing to the parallel position.

Figure 3:
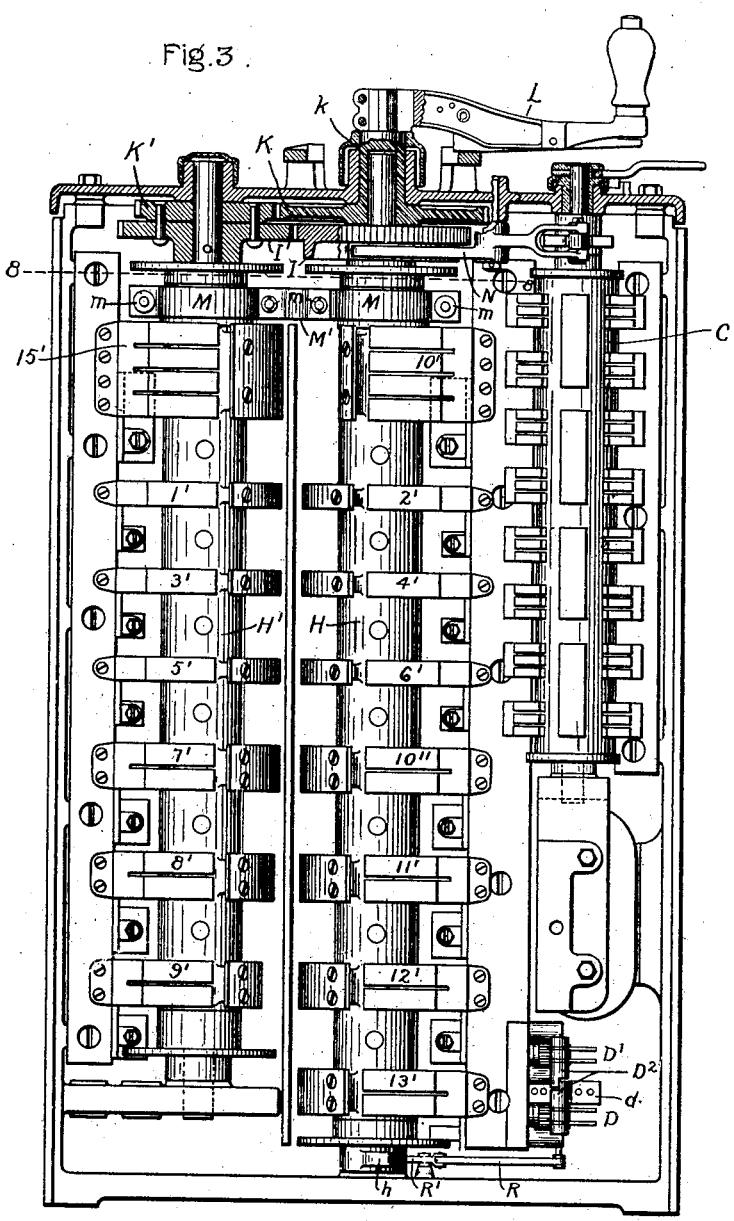
Figure 4:
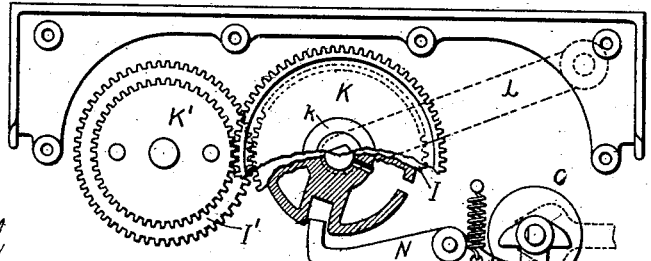
Figure 5:
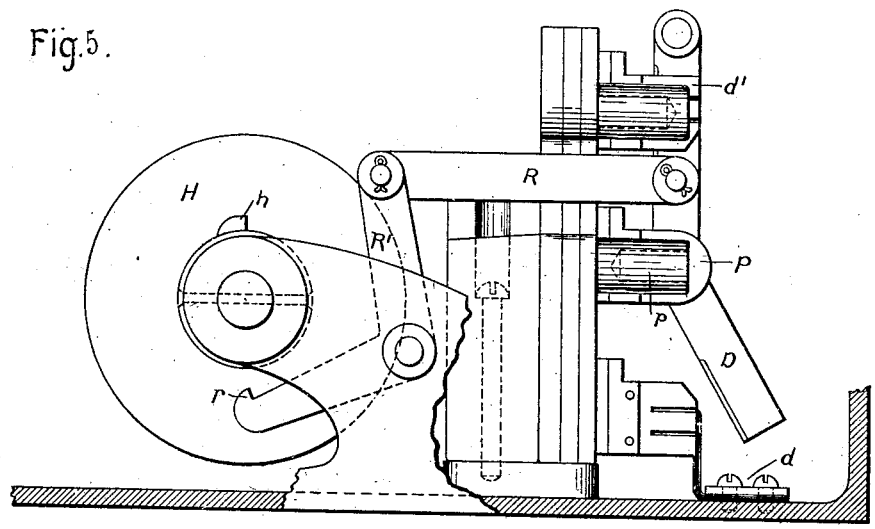
Figure 6:
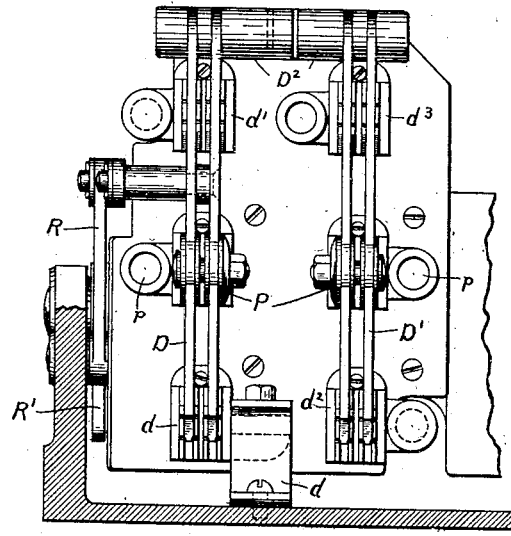
Figure 7:
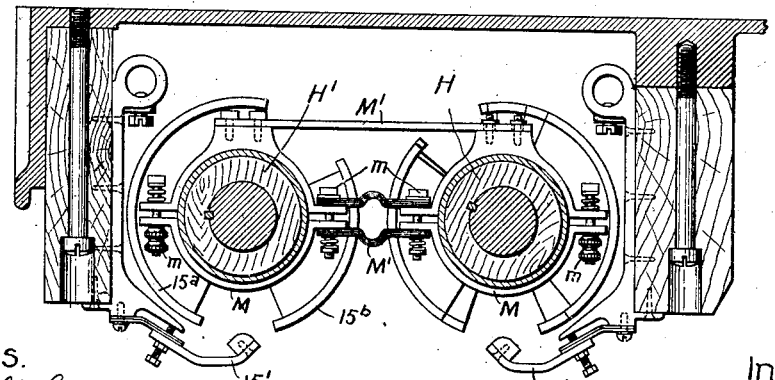

In the accompanying drawings, Figure 1 is a diagram of the circuits in my improved controller. Fig. 2 is a diagram of four motors connected in series multiple with a switch for cutting out one pair. Fig. 3 is an elevation of the controller mechanism. Fig. 4 is a top plan view, partly in section. Fig. 5 is a bottom plan view, on an enlarged scale, of the cut-out switch in the lower part of the controller. Fig. 6 is a side view of the same. Fig. 7 is a top plan cross-sectional view on the line 8 8, Fig. 3.

The diagram Fig. 1 shows the circuits for controlling four motors, whose armatures are shown at $A'$ $A^2$ $A^3$ $A^4$ and the corresponding field-coils at $B'$ $B^2$ $B^3$ $B^4$. Armature $A'$ is connected with the reversing-switch C by leads $a'$, armatures $A^2$, $A^3$, and $A^4$, and the field-coils $B'$ $B^2$ $B^3$ $B^4$ being similarly connected by the leads $a^2$ $a^3$ $a^4$ $b'$ $b^2$ $b^3$ $b^4$, respectively. One terminal of the field-coils $B'$ $B^3$ connects with a common lead $b^5$, running to a switch-blade D. One terminal of the field-coils $B^2$ $B^4$ connects with a common lead $b^6$, running at one end to ground at E and at the other end to a contact $d$, with which the blade D can engage.

At F is a resistance, whose several coils are connected by leads 1 to 10 with the fingers $1'$ to $10'$, respectively. For the sake of convenience the fingers are divided into two sets, one on each side of the controller, coöperating with its own contact-cylinder. Fig. 1 shows the left-hand set comprising fingers $1'$ $3'$ $5'$ $7'$ $8'$ $9'$ and also a finger $15'$, connected by lead 15 with the trolley G. The right-hand set comprises fingers $2'$, $4'$, $6'$, and $10'$, the latter being duplicated at $10''$. Other fingers in the right-hand set are $11'$, connected by lead 11 with a contact-plate $d^2$ and a finger of the reversing-switch, $12'$ connected by lead 12 with a contact-plate $d'$, and $13'$ connected by the lead 13 with the ground-lead $b^6$. A fourth contact-plate $d^3$ is connected by the lead 14 with a finger of the reversing-switch. A branch lead $10'''$ connects the lead 10 with a switch-blade $D'$, adapted to make contact with the plates $d^2$ $d^3$, blade D making corresponding contact with the plates $d$ $d'$.

The left-hand controller-cylinder carries two sets of contact-segments, one set being $15^a$ $1^a$ $3^a$ $5^a$ $7^a$ $8^a$ $9^a$ and the other set $15^b$ $1^b$ $3^b$ $5^b$ $7^b$ $8^b$ $9^b$, said segments being of the respective lengths and positions shown in Fig. 1. The segments in each set are electrically connected together. The right-hand cylinder carries two sets of contact-segments $10^a$ $2^a$ $4^a$ $6^a$ looped together, $11^a$ and $12^a$ looped together, and $10^b$ $2^b$ $4^b$ $6^b$ looped together, $10^{bb}$ and $11^b$ looped together, and $12^b$ and $13^b$ looped together. $11^a$ and $11^b$ are also looped together. $15^a$, $15^b$, $10^a$, and $10^b$ are all looped to a common connecting-strip $16^a$.

In any one of the first seven positions of the right and left hand sets of contact-segments and fingers the circuit is as follows: from trolley to finger $15'$, segments $15^a$ and $1^a$ $2^a$ $3^a$ or the like up to $8^a$, the corresponding coils of the resistance F, leads 10 $10'''$, switch-blade $D'$ and lead 14 to the reversing-switch C, where it divides between the armatures $A'$ $A^3$, then through the field-coils $B'$ $B^3$ in parallel to lead $b^5$, switch-blade D, lead 12, finger $12'$, segments $12^a$ $11^a$, finger $11'$ and lead 11 to reversing-switch C, where it divides between armatures $A^2$ $A^4$, then through the field-coils $B^2$ $B^4$ to lead $b^6$ to ground. The two groups of motors are thus connected in series multiple, as shown in Fig. 2. If the switch-blade D is thrown over to the ground-contact $d$, leaving the blade D' on contact $d^3$, the result will be to cut out the two motors $A^2 B^2 A^4 B^4$, leaving the first group in multiple. If both switch-blades are thrown to their contacts $d\ d^2$, the first group of motors $A'\ B'\ A^3 B^3$ is cut out, leaving the other group in multiple.

In the eighth position the resistance is short-circuited, the trolley-current passing directly to the motors by way of strip $16^a$, segment $10^a$, finger $10'$, and leads 10 $10'''$.

From the ninth to the fourteenth positions the circuit is as before, from the trolley through the proper number of resistance-coils to the lead 10, where the current divides, part going through lead $10'''$, switch D', lead 14, motors $A'\ B'\ A^3\ B^3$ in multiple, lead $b^5$, switch D, lead 12, finger $12'$, segments $12^b\ 13^b$, finger $13'$, and leads 13 $b^6$ to ground, the other part going by way of finger $10''$, segments $10^{bb}\ 11^b$, finger $11'$, lead 11, motors $A^2\ B^2\ A^4\ B^4$ and lead $b^6$ to ground. The motors are then all in multiple. In position 15 the resistance is short-circuited through the segment $10^b$. The actual construction of a controller embodying these circuit-changing devices is shown in Figs. 3 to 7. The two groups of contact-segments are mounted, respectively, on two cylinders H H', geared to rotate synchronously by the gear-wheels I I'. On the shaft of one cylinder, as H, is sleeved the hub $k$ of a spur-gear K of larger diameter than the gear-wheel I and meshing with a pinion K', secured to the shaft of the cylinder H' and of smaller diameter than the gear-wheel I'. This arrangement of gears causes the cylinders to rotate faster than the handle L, which is secured to the hub $k$, so that a complete rotation of the contact-cylinders can be effected by a two-thirds rotation of the handle. Friction-collars M are placed on each cylinder, made in two parts connected by yielding adjusting-screws $m$. Distance-strips M', one or more of which may be flexible, connect the collars and carry the current from one to the other, as diagramed at $16^a$ in Fig. 1. The usual interlocking lever N is provided between the reversing-switch C and one of the contact-cylinders. The cut-out switch-blades D D' are placed in the lower part of the controller and move in parallel planes. Each blade is preferably double, as shown, and is fulcrumed in a block P, provided with a socket $p$ for the leads $b^5\ 10'''$. The blades are each provided with an insulating-handle $D^2$, each overlapping the other and preferably rabbeted together, so that while the blade D can be thrown to engage the ground-contact $d$, yet the blade D' cannot be moved without also moving D with it. Vice versa, when the blade D is returned to its first position it carries the blade D' with it. As above explained, the moving of blade D to the ground-contact $d$ cuts outs the motors $A^2\ B^2\ A^4\ B^4$, while the moving of both blades to the contacts $d\ d^2$ cuts out the motors $A'\ B'\ A^3\ B^3$. The blades are intended to be moved by hand whenever it is desired to cut out either pair of motors. In order to prevent the contact-cylinders from passing over into the parallel positions when only one pair of motors is being used already connected in multiple, the blade D has pivoted to it a link R, which is pivoted at its other end to a detent-lever R', having a hooked end $r$, adapted to be moved into the path of a lug $h$ on the contact-cylinder whenever the blade D is thrown into engagement with the ground-contact $d$. The lug is so arranged as to abut against the hook when the cylinder has passed over all the series positions, being those numbered 1 to 9 in Fig. 1.

By the construction of the cut-out switch herein described I am enabled to accomplish by means of two switch-blades what it has heretofore required three blades to accomplish. I have accomplished this result by so arranging the cut-out switch-blades and their coöperating contacts that the blade D, in addition to its function of cutting out one of the motors or group of motors when it is moved by itself, also grounds the first motor or group of motors in the equipment when the other blade D' is operated to cut out the first motor or group of motors.

In the arrangement which I have illustrated in the drawings there are four motors in the motor equipment, and the motors are connected in two groups, each group comprising two motors; but it will be evident from an inspection of Figs. 1 and 2 of the drawings that my invention may as well be applied to an equipment having any desired number of motors connected in two groups, so that these said groups may be connected either in series or in parallel by the operation of the main controlling-switch.

What I claim as new, and desire to secure by Letters Patent of the United States, is—

1. In an electric controller, the combination with circuit-controlling devices for two pairs of parallel-connected motors, of a switch comprising two blades, and connections whereby one pair of motors will be cut out when one blade is thrown and the other pair when both blades are thrown.

2. In an electric controller, the combination with circuit-controlling devices for a plurality of motors, of a cut-out switch for said motors comprising two blades, and means for permitting an independent movement of each blade in one direction only.

3. In an electric controller, the combination with circuit-controlling devices for a plurality of motors, of a cut-out switch for said motors comprising two blades, and connections permitting each blade to move independently in one direction, but compelling one to actuate the other when moved in the other direction.

4. In an electric controller, the combination with circuit-controlling devices for a plurality of motors, of a cut-out switch for said motors comprising two blades, one capable of independent movement in one direction and the other in the opposite direction, and means for compelling each to actuate the other when moved in the reverse direction.

5. In an electric controller, the combination with circuit-controlling devices for a plurality of motors, of a cut-out switch comprising two blades pivoted to move in parallel planes, and a handle on each blade projecting into the path of movement of the other handle.

6. In an electric controller, the combination of a circuit-controlling device for a plurality of motors, of a cut-out switch comprising two blades pivoted to move in parallel planes and overlapping handles carried by said blades.

7. In an electric controller, the combination with a series-parallel contact-cylinder having a lug on its shaft, of a hooked lever adjacent to the shaft, a cut-out switch having two parallel blades independently movable, a link connecting one of said blades with the lever, and overlapping handles on the blades.

8. In an electric controller, means for electrically connecting two contact-cylinders, comprising electrically-connected collars having a sliding fit on said cylinders.

9. In an electric controller, means for electrically connecting two parallel contact-cylinders, comprising a divided collar on each cylinder, spring-fastenings for said collars, and conductors connecting said collars.

10. In an electric controller, means for electrically connecting two parallel contact-cylinders, comprising a divided collar on each cylinder, spring-fastenings for said collars, and one or more flexible conductors connecting said collars.

In witness whereof I have hereunto set my hand this 12th day of February, 1901.

JOHN B. LINN.

Witnesses:
BENJAMIN B. HULL,
MARGARET E. WOOLLEY.